United States Patent [19]
Arakawa et al.

[11] Patent Number: 5,795,427
[45] Date of Patent: Aug. 18, 1998

[54] METHOD OF APPLYING A PAINT PROTECTING FILM TO A VEHICLE BODY

[75] Inventors: Takashi Arakawa, Hiratsuka; Kimio Shiraishi, Zama, both of Japan

[73] Assignee: Nissan Motor Co., Ltd., Yokohama, Japan

[21] Appl. No.: 568,136

[22] Filed: Dec. 6, 1995

[30] Foreign Application Priority Data

Dec. 13, 1994 [JP] Japan .................................. 6-309004

[51] Int. Cl.⁶ .................................................. B32B 31/18
[52] U.S. Cl. ........................ 156/256; 156/211; 156/212; 156/267
[58] Field of Search .............................. 156/212, 211, 156/267, 256, 250, 475, 514

[56] References Cited

U.S. PATENT DOCUMENTS

| | | | |
|---|---|---|---|
| 3,316,012 | 4/1967 | Thier .................................... | 296/136 |
| 3,466,214 | 9/1969 | Polk et al. ............................ | 156/267 |
| 4,328,067 | 5/1982 | Cesano ................................ | 156/267 |
| 4,550,048 | 10/1985 | Nakagawa ........................... | 156/252 |
| 4,920,840 | 5/1990 | Fink ..................................... | 156/267 |
| 5,080,749 | 1/1992 | Moriya et al. ....................... | 156/267 |
| 5,127,974 | 7/1992 | Tomiyama et al. .................. | 156/247 |
| 5,294,278 | 3/1994 | Matsui et al. ........................ | 156/267 |

*Primary Examiner*—Richard Crispino
*Attorney, Agent, or Firm*—Foley & Lardner

[57] ABSTRACT

This is a method for providing a hole in a paint protecting film which is applied to a painted vehicle body, so that a specific site not suitable for covering by the film, such as a washer nozzle, is excluded from the covering. A cylindrical cutter is placed on the vehicle body with its blade pointing upward so as to surround the specific site. The film is attached to the body and a press member is pressed against the cutter so that the film is cut by the blade. The piece of film cut by the cutter is removed, and the film surrounding the cut area is attached to the body. This renders the cutting operation easier, and avoids the risk of scratching the paint during the cutting operation.

7 Claims, 6 Drawing Sheets

METHOD OF APPLYING A PAINT PROTECTING FILM TO A VEHICLE BODY

FIELD OF THE INVENTION

This invention relates to a method of stretching a film over a painted body of a vehicle in order to temporarily protect the paint.

BACKGROUND OF THE INVENTION

After a vehicle body has been painted and before the finished vehicle is delivered to the owner, the vehicle may be transported by ship, trailer or railway, or may be temporarily kept indoors or outdoors. During this time, the paint may be temporarily protected by applying to it a paint protecting film of a plastic resin coated with a viscous agent.

This paint protecting film is stretched over the painted surface of the vehicle body by uniformly pressing the film on the surface with a roller or the like. However if for example the nozzle of the window washer projecting from the engine hood were covered by the film, the window washer could not be used, hence in the case of a vehicle part which it is not appropriate to cover, a hole was cut in the film using an implement such as a cutter knife so that the part was not covered.

However, if the paint is scratched when part of the film was cut away with a blade such as a cutter knife, the commercial value of the vehicle falls and the durability of the paint is impaired. To overcome this problem, Tokkai Hei 5-237935 published by the Japanese Patent Office in 1993 proposes a method wherein a first film having a hole is applied to the area so that it surrounds a part like the window washer nozzle, a second film is laid over this film and the other part of the vehicle body, and the unnecessary parts of the second film are then cut away by the cutter knife. The paint under the cutting line is covered by the first film and the scratching of the paint with the knife blade is thereby prevented.

Further, Tokkai Hei 5-237937, Tokkai Hei 5-278108 and Tokkai Hei 5-278118 published by the Japanese Patent Office in 1993 disclose methods not using a blade of any kind wherein the protecting film is melted by a heater or the like so as to cut it away.

However, in the former case, as the film covering a projecting member is cut away around the member, the cutting operation cannot be done in a horizontal plane and requires considerable skill. In the latter case, the temperature control of the heater is rather difficult.

SUMMARY OF THE INVENTION

It is therefore an object of this invention to easily remove the parts of a paint protecting film corresponding to parts not suitable for covering.

In order to achieve the above object, this invention provides a method of attaching a paint protecting film to a painted body of a vehicle and leaving a specific site uncovered. The specific site is, for example, a washer nozzle that ejects a washer fluid toward a window at the front of the vehicle from the body.

The method comprises the steps of disposing a cutter having blade on the body such that the blade surrounds the site and projects from the body, covering the paint including the cutter with the film, pressing a press member having a contact surface with the blade against the cutter covered by the film so that the film is cut by the blade, and attaching the film to the body in an area surrounding the cutter after the film is cut by the blade.

It is preferable that the pressing step comprises a step for rotating the press member while it is pressed against the blade.

It is also preferable that the cutter is provided with a guide that moves parallel to the blade in the vicinity of the blade.

It is also preferable that the disposing step comprises a step for interposing a damper between the cutter and the body.

Alternatively, the method comprises the steps of disposing a damper on the body so as to surround the specific site, covering the body including the damper with the film, pressing a cutter having a blade of effectively the same shape as the damper against the damper covered by the film so that the film is cut by the blade, and attaching the film to the body in an area surrounding the damper after the film is cut by the blade.

The details as well as other features and advantages of this invention are set forth in the remainder of the specification and are shown in the accompanying drawings.

DESCRIPTION OF THE PREFERRED EMBODIMENTS

Figure 1:
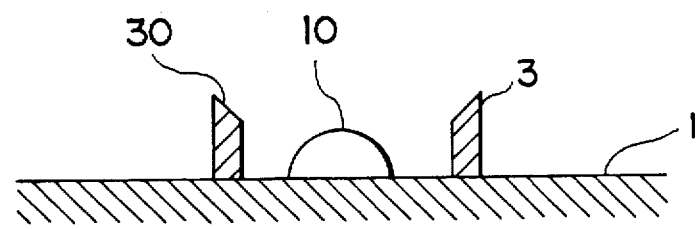
FIG. 1 is a vertical sectional view of a cutter according to a first embodiment of this invention.

Referring to FIG. 1 of the drawings, a washer nozzle 10 projects from a body 1 of an automobile. After the body 1 is painted, a film 2 protecting the paint is stretched over it, but care must be taken not to cover a washer nozzle 10 so that the washer remains functional.

A cutter 3 formed in a cylindrical shape is disposed on the surface of the body so as to surround the washer nozzle 10. A circular blade 30 pointing upward is formed at the upper end of the cutter 3. The cutter 3 may be fixed to a predetermined position of the body by a magnetic member.

Figure 2:
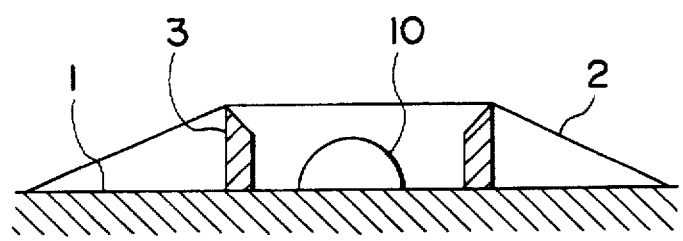
FIG. 2 is a vertical sectional view of the cutter and a film disposed on the cutter according to the first embodiment of this invention.

Next, the film 2 is applied to the body 1 so that the body 1 and the cutter 3 are covered, as shown in FIG. 2.

The film 2 is formed of a plastic or other type of resin, and the surface of the film in contact with the body 1 is coated with a layer of a pressure-sensitive viscous agent, not shown. Due to this layer of viscous agent, the film 2 adheres to the body 1 and the blade 30 of the cutter 3. A considerable area of the film 2 around the cutter 3 is unattached to the body 1.

Figure 3:
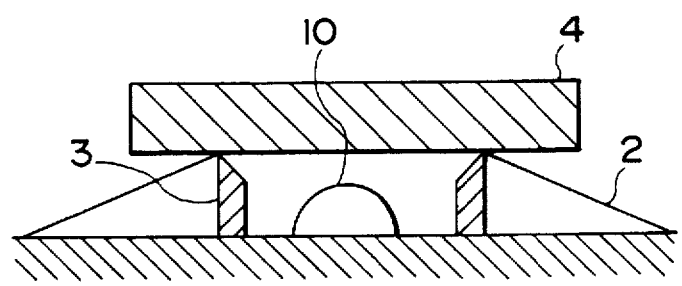
FIG. 3 is a vertical sectional view of the cutter, the film disposed on the cutter, and a press member according to the first embodiment of this invention.

When the cutter 3 is covered by the film 2, a press member 4 comprising a flat plate is pressed against the blade 30 of the cutter 3 as shown in FIG. 3.

Figure 4:
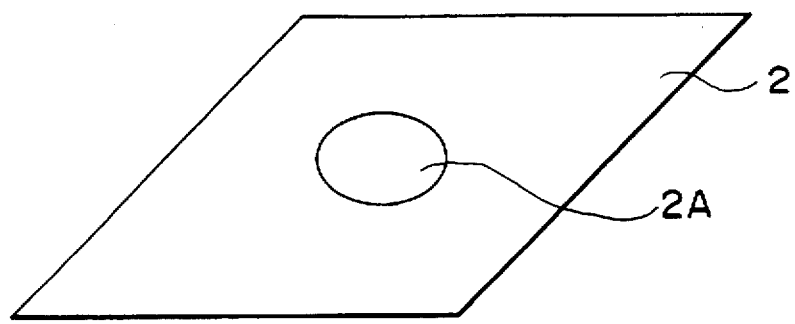
FIG. 4 is a perspective view of the film wherein a cutting operation has been performed, according to the first embodiment of this invention.

Due to the pressure of the press member 4, a throughole 2A of the same diameter as the outer diameter of the cutter 3 is formed by the blade 30 in the film 2 as shown in FIG. 4.

If the press member 4 is rotated on the blade 30, the pressure is evenly applied to the whole circumference of the blade 30 and the film 2 can be cut clean.

After the throughole 2A of effectively the same outer diameter as that of the cutter 3 is formed, the cutter 3 projects from the throughole 2A, and the piece of film cut out by the blade 30 is removed with the cutter 3. When the part surrounding the throughole 2A of the film 2 is pushed against the body 1, the film 2 adheres to the body 1 with the washer nozzle 10 exposed.

In this way, the paint of the body 1 around the washer nozzle 10 is protected while the washer nozzle 10 projects from the film 2, thus permitting use of the washer nozzle 10 while the vehicle is being transported or warehoused.

As the throughole 2A is formed only by pressing the film 2 against the blade 30 of the cutter 3 via the press member 4, the throughole 2A can easily be formed without any special training.

Figure 5:
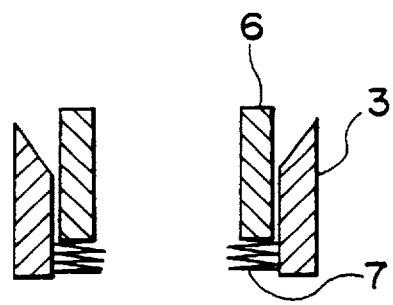
FIG. 5 is a vertical sectional view of a cutter and guide according to a second embodiment of this invention.

FIG. 5 shows a second embodiment of this invention. In this embodiment, the cutter 3 according to the first embodiment is provided with a guide 6 for protecting the blade 30, and a spring 7 pushing the guide 6 upward.

The guide 6 fits on the inner circumference of the cutter 3 such that it is free to move in an axial direction, one end of the guide 6 being pushed by the spring 7 disposed at the base end of the cutter 3 such that it projects from the blade 30.

When the film 2 is applied to the body 1 such that it covers the cutter 3, the film 2 is pushed by the spring 7 so that it is fixed on the guide 6 projecting from the blade 30. As the blade 30 does not come in contact with the film 2, there is no risk of the blade 30 catching and tearing the film 2 when the film 2 is stretched, and the operator is also protected from the blade 30.

When the press member 4 is pressed on the cutter 3 to cut away the film, the press member 4 moves the guide 6 downwards. As a result, the press member 4 comes in contact with the blade 30 as in the case of the first embodiment, and the film 2 is cut along the blade 30 without fail.

When the press member 4 leaves the cutter 3, the guide 6 pushed by the spring 7 projects from the blade 30, so the piece of film fixed on the end of the guide 6 can easily be removed without touching the blade 30.

Figure 6:
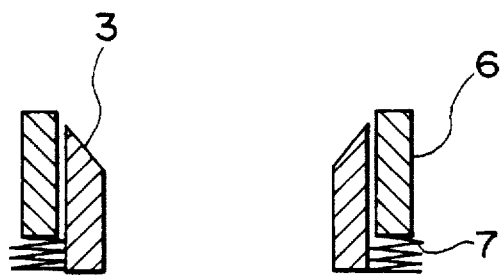
FIG. 6 is a vertical sectional view of a cutter and guide according to a third embodiment of this invention.

FIG. 6 shows a third embodiment of this invention. Herein, the guide 6 and spring 7 of the second embodiment are disposed on the outer circumference of the cutter 3, the remaining features of the construction being the same as those of the second embodiment.

Figure 7:
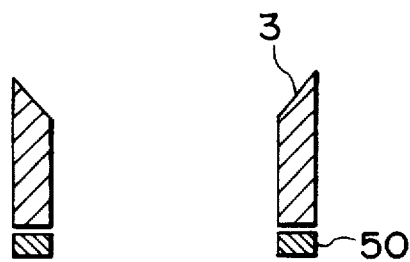
FIG. 7 is a vertical sectional view of a cutter and damper according to a fourth embodiment of this invention.
Figure 8:
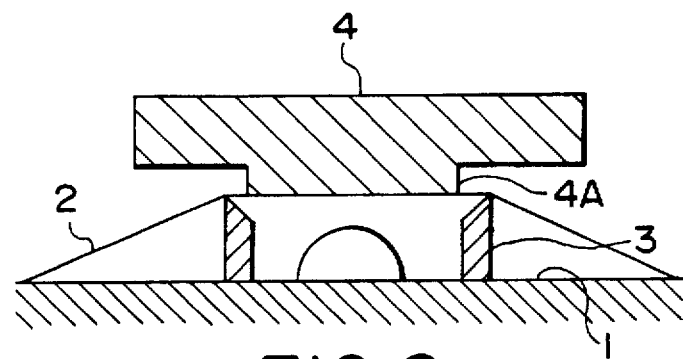
FIG. 8 is a vertical sectional view of a cutter, a film disposed on the cutter and a press member according to a fifth embodiment of this invention.

FIG. 7 shows a fourth embodiment of this invention. Herein, a ring shaped damper 50 formed of a plastic or rubber material, for example, is inserted between a base of the cutter 3 and the body 1. The damper 50 prevents the base of the cutter 3 from directly contacting the painted surface of the body 1 and scratching the paint, when the blade 30 is pressed downward FIG. 8 shows a fifth embodiment of this invention. Herein, a projection 4A that fits on the inner circumference of the cutter 3 projects from the press member 4 of the first embodiment, the remaining features of the construction being the same as those of the first embodiment.

When the press member 4 is pressed on the cutter 3, the projection 4A gives a tensile stress to the film 2 on the inner circumference of the cutter, hence according to this embodiment, the film 2 can easily be cut simply by lightly pushing the press member 4 toward the blade 30.

Figure 9:
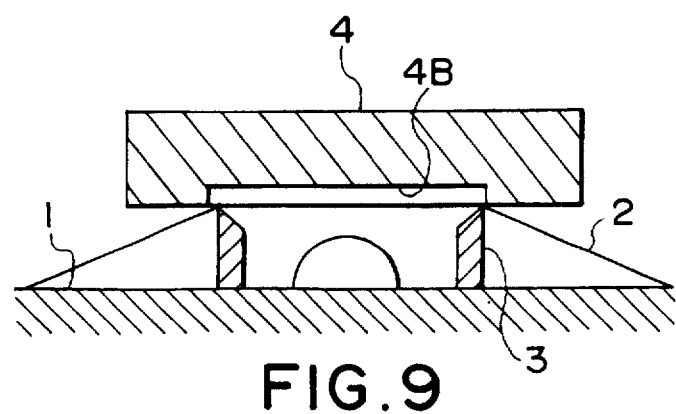
FIG. 9 is a vertical sectional view of a cutter, a film disposed on the cutter and a press member according to a sixth embodiment of this invention.

FIG. 9 shows a sixth embodiment of this invention. Herein, a recess 4B is provided instead of the projection 4A of the fifth embodiment, the remaining features being the same as those of the first embodiment.

When the press member 4 is pressed on the cutter 3, the recess 4B gives a tensile stress to the film 2 on the outer circumference of the blade 30, hence the film 2 can easily be cut simply by lightly pushing the press member 4 toward the body 1.

Figure 10:
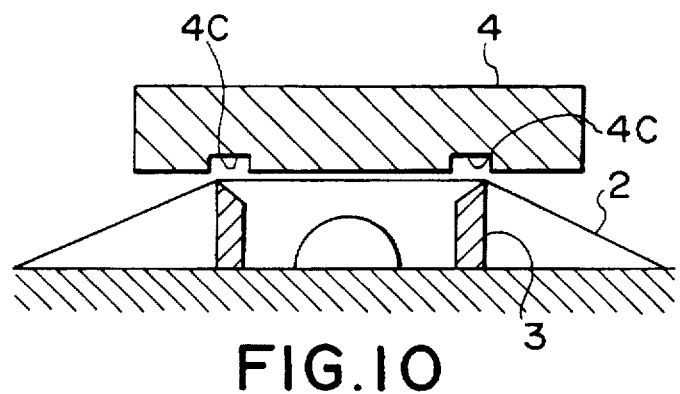
FIG. 10 is a vertical sectional view of a cutter, a film disposed on the cutter and a press member according to a seventh embodiment of this invention.

FIG. 10 shows a seventh embodiment of this invention. Herein, the recess 4B of the sixth embodiment is replaced by an annular recess 4C which can engage with the cutter 3, the remaining features being the same as those of the first embodiment.

In this case also, the film 2 can easily be cut simply by lightly pushing the press member 4 toward the blade 30.

Figure 11:
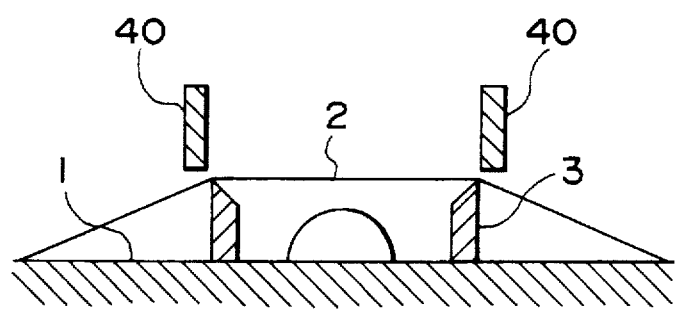
FIG. 11 is a vertical sectional view of a cutter, a film disposed on the cutter and a press member according to an eighth embodiment of this invention.

FIG. 11 shows an eighth embodiment of this invention. In this case, the press member 4 of the first embodiment is replaced by a cylindrical press member 40 which fits on the outer circumference of the cutter 3, the remaining features being the same as those of the first embodiment.

When the press member 40 is pressed on the cutter 3, the lower end of the annular press member 40 gives a tensile stress to the film 2 on the outer circumference of the blade 30. When the press member 40 is moved further in the direction of the body 1, the inner circumference of the press member 40 fits on the outer circumference of the blade 30, and the blade 30 cuts the film 2.

According to this embodiment, the press member 40 does not come in contact with the blade 30, so the durability of the blade 30 and press member 40 are improved.

Figure 12:
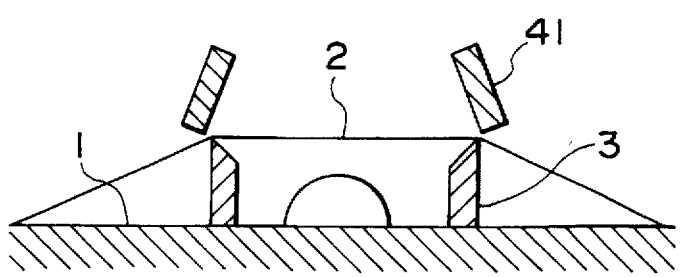
FIG. 12 is a vertical sectional view of a cutter, a film disposed on the cutter and a press member according to a ninth embodiment of this invention.

FIG. 12 shows a ninth embodiment of this invention. Herein, a tapering press member 41 whereof the diameter increases towards the base is used, the remaining features of the construction being the same as those of the first embodiment.

When the press member 41 presses the film 2 on the cutter 3, the lower end of the annular press member 41 stretches the film on the blade 30 outward. When the press member 41 is moved further toward the body 1, therefore, the film 2 is easily cut by the blade 30. In this case also, the press member 41 does not come in contact with the blade 30, so the durability of the blade 30 and press member 41 are improved.

Figure 13:
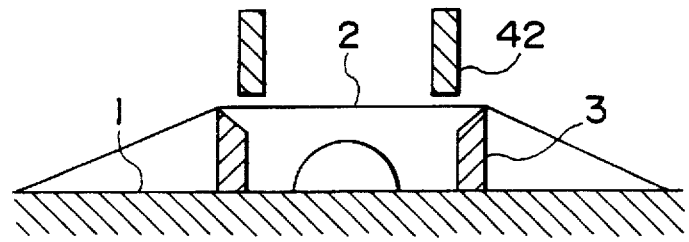
FIG. 13 is a vertical sectional view of a cutter, a film disposed on the cutter and a press member according to a tenth embodiment of this invention.

FIG. 13 shows a tenth embodiment of this invention. Herein, a cylindrical press member 42 which fits on the inner circumference of the cutter 3 is used, the remaining features of the construction being the same as those of the first embodiment.

When the press member 42 is pressed on the cutter 3, the lower end of the press member 42 pulls the film 2 towards the inside of the blade 30. By pushing the press member 42 further towards the body 1, the film 2 is easily cut by the blade 30.

In this case also, the press member 42 does not come in contact with the blade 30, so the durability of the blade 30 and press member 42 are improved.

Figure 14:
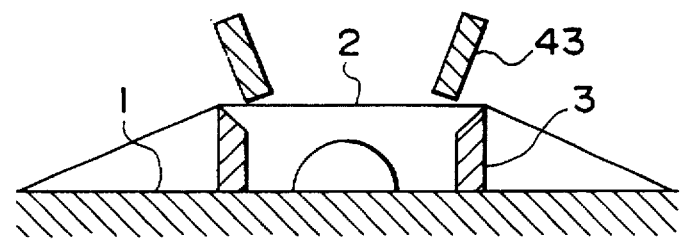
FIG. 14 is a vertical sectional view of a cutter, a film disposed on the cutter and a press member according to an eleventh embodiment of this invention.

FIG. 14 shows an eleventh embodiment of this invention. Herein, a tapering press member 43 whereof the diameter decreases towards the base is used, the remaining features of the construction being the same as those of the first embodiment.

When the press member 43 is pressed on the cutter 3, the lower end of the press member 43 pulls the film 2 towards the inside of the blade 30. By pushing the press member 43 further towards the body 1, the film 2 is easily cut by the blade 30.

In this case also, the press member 43 does not come in contact with the blade 30, so the durability of the blade 30 and press member 43 are improved.

Figure 15:
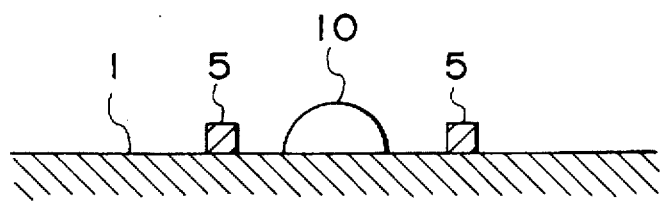
FIG. 15 is a vertical sectional view of a damper according to a twelfth embodiment of this invention.
Figure 16:
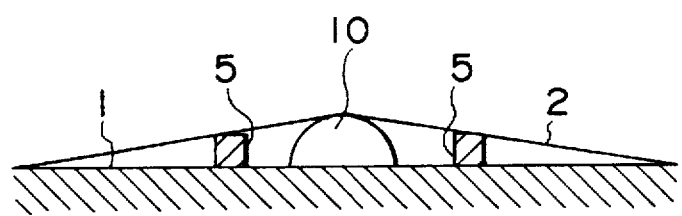
FIG. 16 is a vertical sectional view of a damper and a film disposed on the damper according to the twelfth embodiment of this invention.
Figure 17:
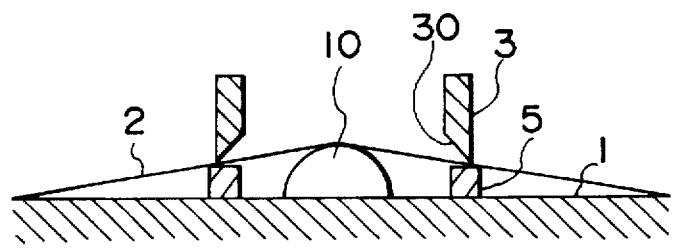
FIG. 17 is a vertical sectional view of the damper, the film disposed on the damper and a cutter according to the twelfth embodiment of this invention.

FIGS. 15–17 show a twelfth embodiment of this invention. As in the case of the first embodiment, this is another way of avoiding covering the washer nozzle 10 by the film 2.

First, a damper 5 having an annular cross-section and a larger diameter than that of the washer nozzle 10 is disposed outside the washer nozzle 10 on the surface of the body 1. The height of the damper 5 is less than that of the washer nozzle 10, and it is formed of a plastic, rubber or other elastic material. More preferably, it is formed of a plastic magnet and attached to the body 1 so that it does not move from a predetermined position.

When this damper 5 is installed, the damper 5 and body 1 are covered by the film 2. The tip of the washer nozzle 10 then projects from the damper 5, and the film 2 is fixed to the tip of the nozzle 10 in effectively the central part of the damper 5.

Next the cutter 3, at the tip of which the circular blade 30 is installed, is pressed against the damper 5 as shown in FIG. 17. The blade 30 has a diameter smaller than the outer diameter of the damper 5 but larger than the inner diameter of same.

The film 2 is thereby cut by the blade 30 on the damper 5 so that a hole of effectively the same diameter as that of the blade 30, is formed in the film 2. If the cutter 3 is then rotated while pressing it against the damper 5, the film 2 can' be cut clean without fail.

The damper 5 and the cut part of the film 2 are then removed from the hole, and any part of the film 2 surrounding the hole which has been pulled up, is pressed against the body 1. In this way, the film 2 protects the paint film covering the body 1, and as the washer nozzle 10 projects from the film 2, it can always be used.

Even if the height of the damper 5 is greater than that of the washer nozzle 10, the same procedure can be performed.

In any of the aforesaid methods, if another piece of film having a smaller hole than that in the aforesaid film 2 is attached to the area surrounding the washer nozzle 10, the area of the paint film on the body 1 not covered by the film 2, can be reduced to the minimum.

Further, the aforesaid embodiments were described in the case of a washer nozzle 10, however this invention may be applied also to any parts that are not suitable for covering by a film. Moreover, it is not essential for these parts to project from the body 1 as in the case of the washer 10.

The embodiments of this invention in which an exclusive property or privilege is claimed are defined as follows:

1. A method of attaching a paint protecting film to a painted body of a vehicle and leaving a specific site uncovered, comprising the steps of:

disposing a cutter on said body such that a blade of said cutter surrounds said site and projects from said body, covering said body, having said cutter disposed thereon, with said film, pressing a press member against said cutter covered by said film so that said film is cut by said blade, attaching said film to said body in an area surrounding said cutter after said film is cut by said blade.

2. A method of attaching a paint protecting film as defined in claim 1, wherein said pressing step comprises a step for rotating said press member while it is pressed against said blade.

3. A method of attaching a paint protecting film as defined in claim 1, wherein said cutter is provided with a guide that moves parallel to said blade in the vicinity of said blade.

4. A method of attaching a paint protecting film as defined in claim 1, wherein said disposing step comprises a step for interposing a damper between said cutter and said body.

5. A method of attaching a paint protecting film as defined in claim 1, wherein said specific site is a washer nozzle that ejects a washer fluid toward a window at the front of said vehicle from said body.

6. A method of attaching a paint protecting film to a painted body of a vehicle, and leaving a specific site uncovered, comprising the steps of:

disposing a damper on said body so as to surround said specific site and protect said body, covering said body having said damper disposed thereon, with said film, so that the entirety of said damper is between said body and said film, pressing a cutter having a blade of effectively the same shape as said damper against said damper covered by said film so that said blade cuts said film on said damper without damaging said body, and attaching said film to said body in an area surrounding said damper after said film is cut by said blade.

7. A method of attaching a paint protecting film as defined in claim 6, wherein said specific site is a washer nozzle that ejects a washer fluid toward a window at the front of said vehicle from said body.

* * * * *